United States Patent

[11] 3,612,244

[72] Inventors Edward L. Raub, Sr.
New London;
Edward L. Raub, Jr., New London, Conn.;
Richard P. Scholfield, Armonk, N.Y.
[21] Appl. No. 832,998
[22] Filed June 13, 1969
[23] Division of Ser. No. 607,702, Jan. 6, 1967, abandoned.
[45] Patented Oct. 12, 1971
[73] Assignee New Concepts, Inc.
Peekskill, N.Y.

[54] DISPLAY DEVICES MOVABLE THROUGH A DISPLAY SPACE AND A STORAGE SPACE AND CONVEYOR MECHANISM THEREFOR
5 Claims, 8 Drawing Figs.
[52] U.S. Cl. .................................................. 198/25, 40/36, 198/33, 198/76
[51] Int. Cl. ................................................ B65g 47/24, B65g 47/32, G09f 11/30
[50] Field of Search .......................................... 198/25, 85, 34, 102–103; 40/36, 78.09; 198/33 R, 76, 137

[56] References Cited
UNITED STATES PATENTS
3,006,453  10/1961  Tonelli ........................ 198/25

Primary Examiner—Edward A. Sroka
Attorney—Cushman, Darby & Cushman

ABSTRACT: A conveying mechanism, for example, for moving each of a multiplicity of display devices through both a viewing area and a storage area. In the embodiment described herein, the mechanism includes a first and second sprocket wheel of different diameters mounted for rotation about a common axis at a common angular speed, first and second endless chains trained about the wheels and first and second drive means on the two chains for engaging a carrier assembly and moving it along the first chain at the speed of that chain and along the second chain at the speed of that chain.

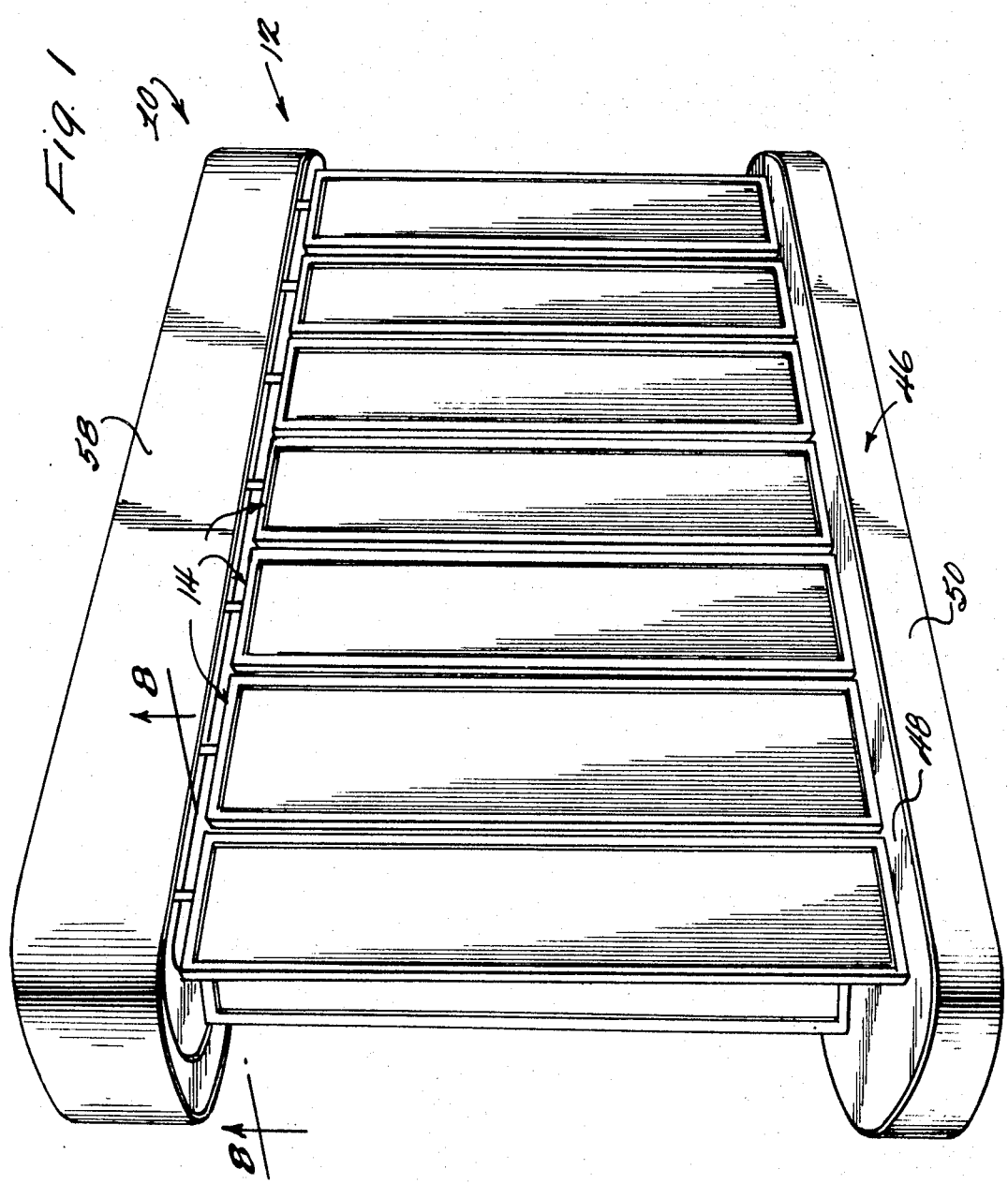

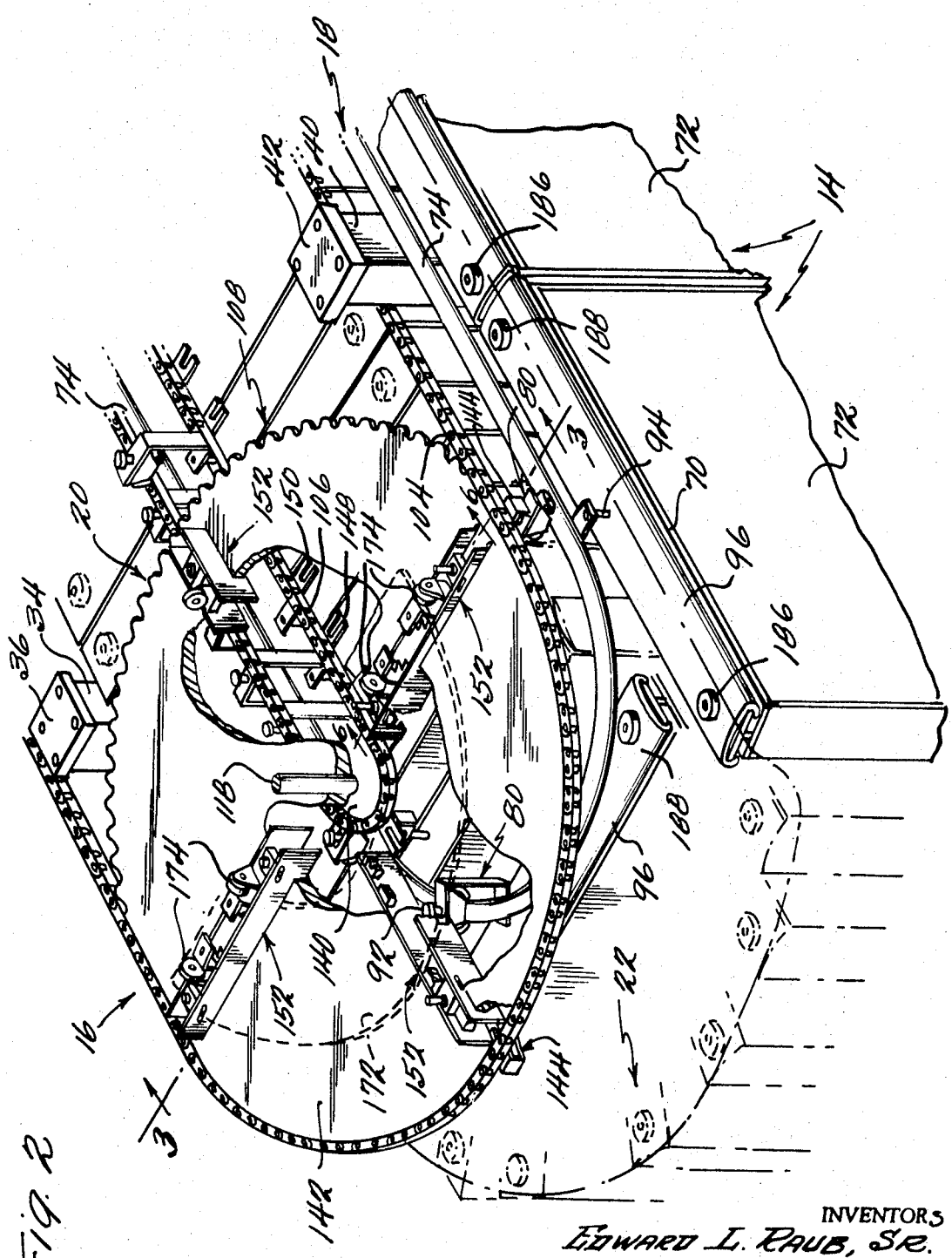

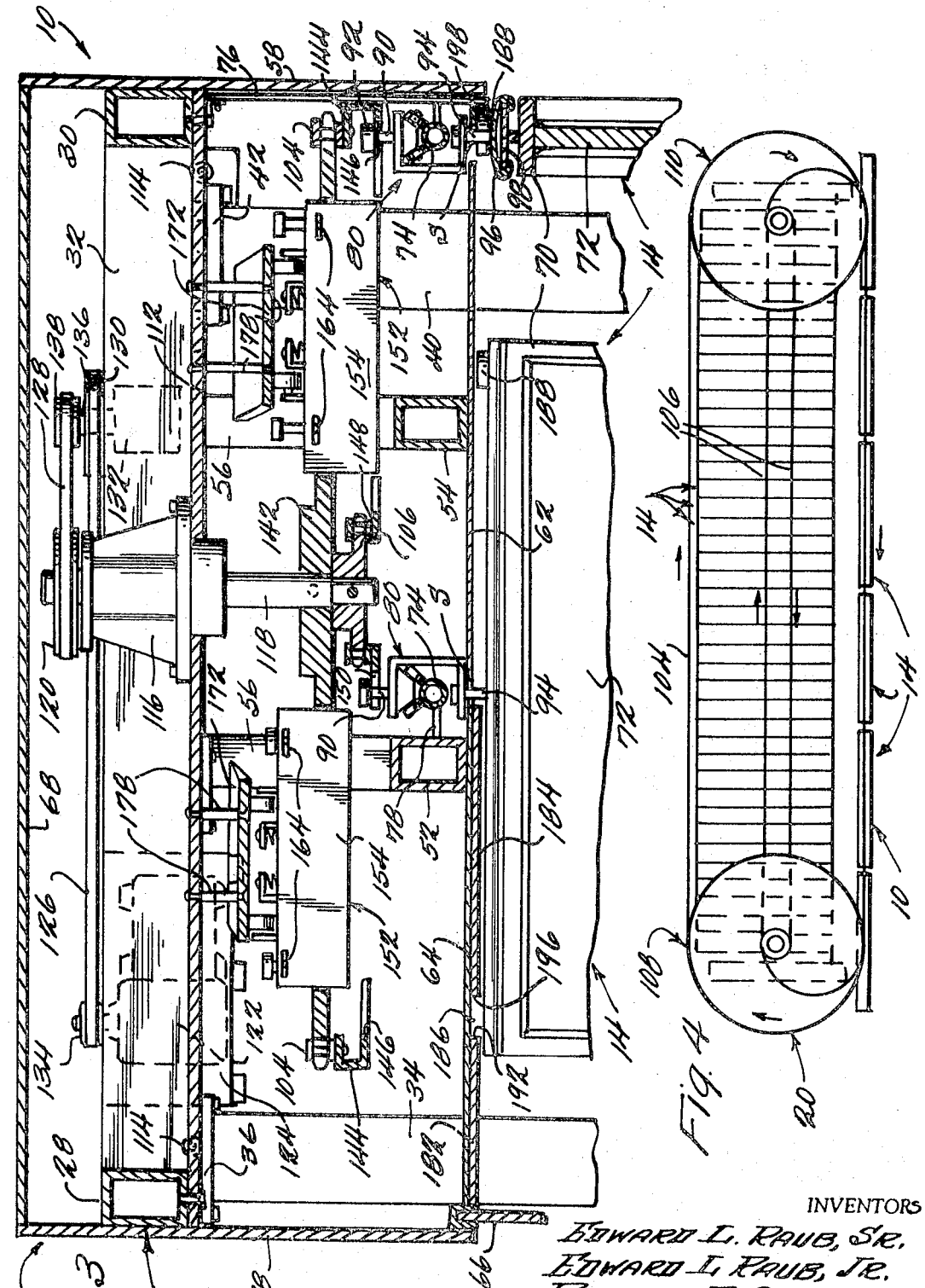

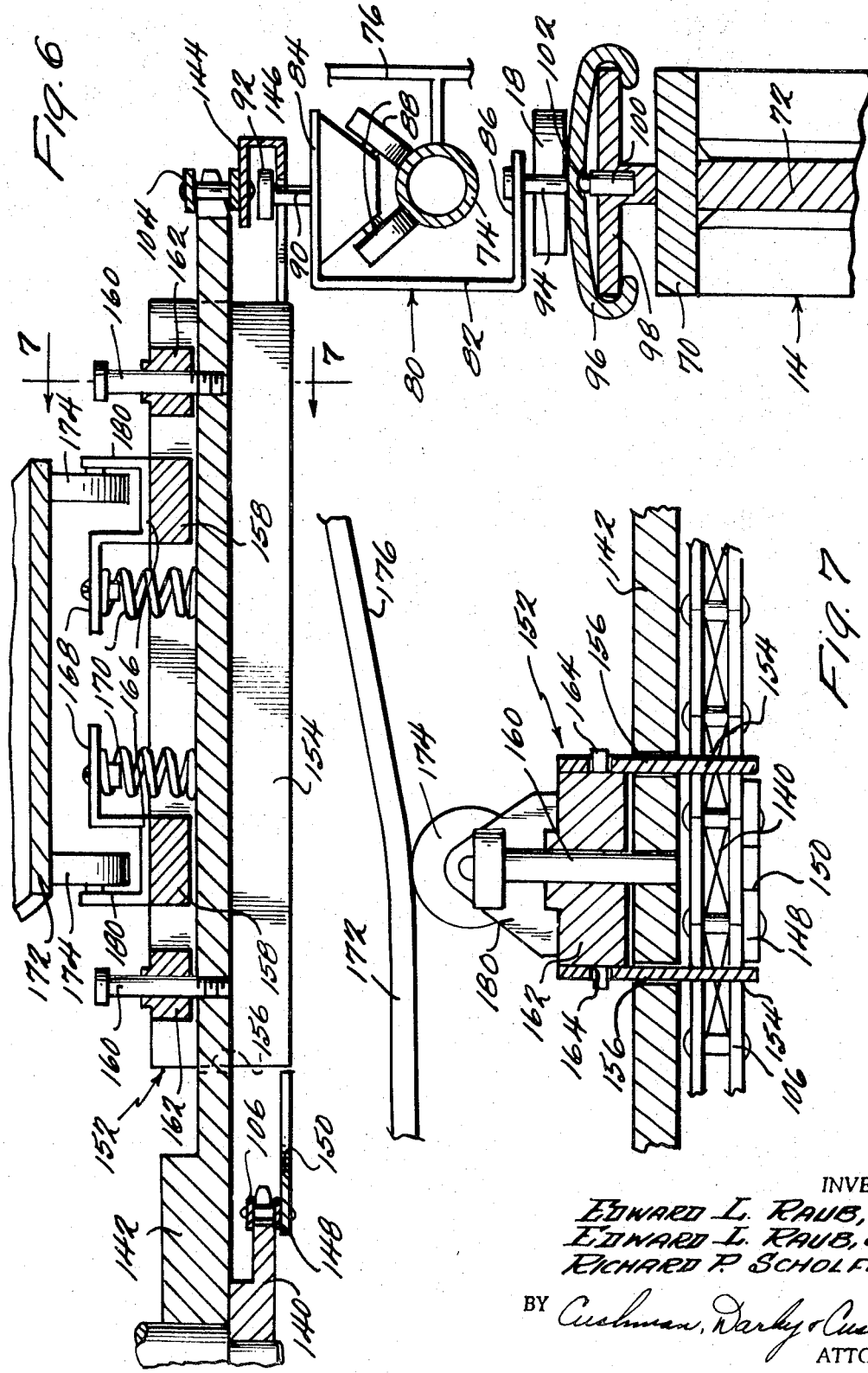

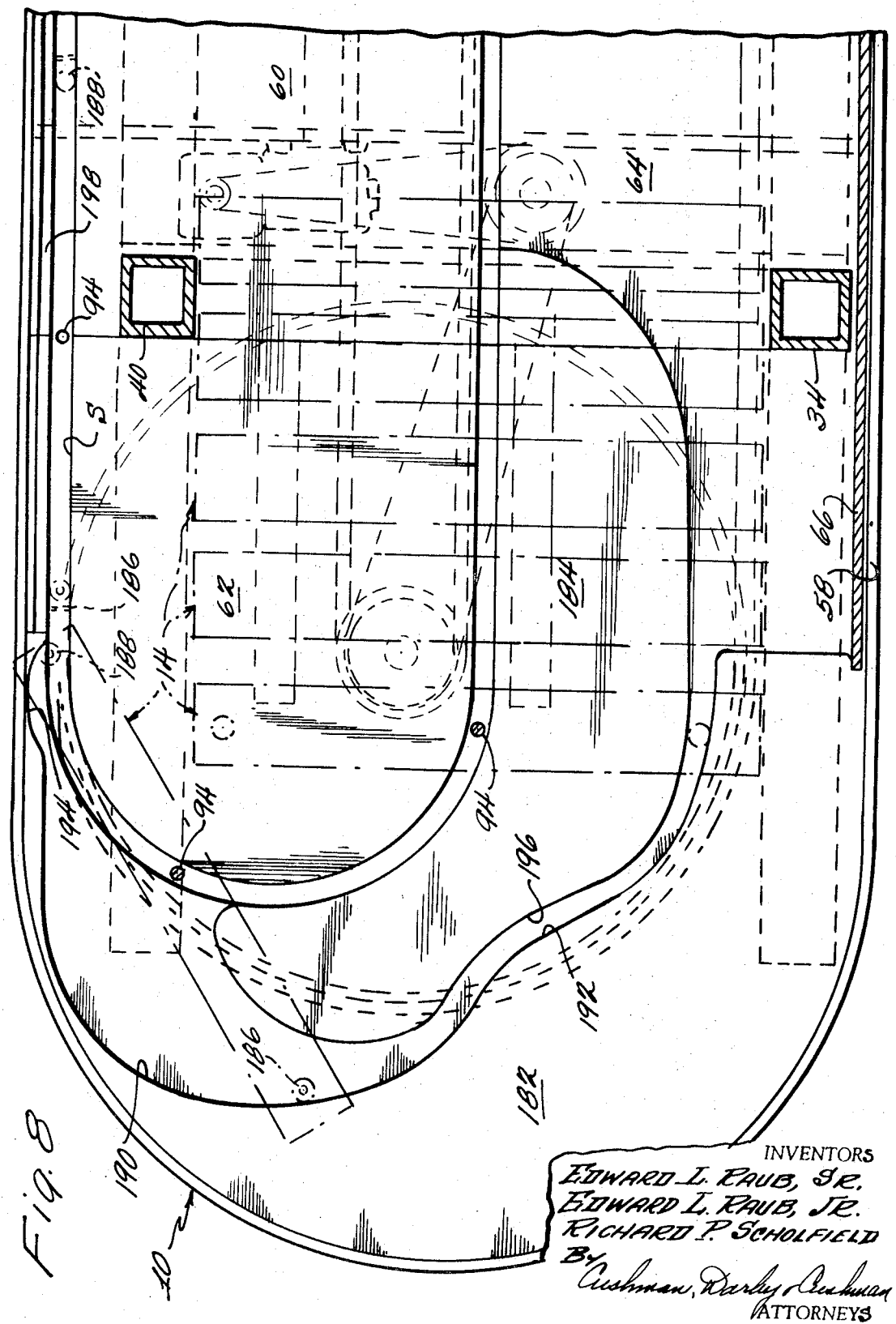

DISPLAY DEVICES MOVABLE THROUGH A DISPLAY SPACE AND A STORAGE SPACE AND CONVEYOR MECHANISM THEREFOR

This application is a division of application Ser. No. 607,702, filed Jan. 6, 1967 now abandoned.

This invention relates to display apparatus and more particularly to display apparatus of the type including a multiplicity of panellike display devices which are moved from a storage space through a display space.

The apparatus of the present invention is particularly applicable in displaying products as well as printed material. In displaying printed material for advertising such as billboards, both inside and outside, it is highly desirable to provide for a constant or periodic change in the printed material which is displayed within a given display space. In order to accomplish this result, the apparatus must provide for a greater number of displays than can be exhibited in the display space and provision must be made to store the displays which are not actually in the display space. The storage problem is easily solved by using film and projecting selected images from the film on the display area. While the general result can be obtained through light projection on a display screen, the image produced by light projection is not always desirable due to the surrounding lighting conditions of the display apparatus. Accordingly, displays of this type have not been adopted to any appreciable extent in outdoor applications due to the existence of varying lighting conditions such as brilliant sunlight and the like. These same drawbacks are likewise evident in indoor display applications. Changing display apparatus of the type presenting actual displays, as distinguished from projected images, obviate the disadvantage of projected image display apparatus but present a storage problem.

There have been display apparatus proposed and utilized which are capable of presenting a changing actual display within a given display space as, for example, a display made up of a series of triangularly shaped display elements mounted with their axes disposed in parallel relation so that by rotating each display element one third of a revolution, three distinct displays can be presented within the space provided. There have been various other proposals which have not received any widespread acceptance. The storage problem of the display apparatus of this type which have heretofore been utilized and proposed has not been satisfactorily solved.

An object of the present invention is the provision of a display apparatus of the type described having a multiplicity of panellike display devices mounted with respect to each other such that a maximum number of such display devices can be disposed within a minimum space for movement into and out of a display space from and into a storage space so that a maximum number of separate displays can be presented within the total confines of the apparatus.

In accordance with the principles of the present invention, this result is obtained by effecting a simultaneous movement of all of the display devices in an endless path, the storage space being arranged to receive successive display devices from the display space while simultaneously successive display devices are moved out of the storage space into the display space, the display devices being moved through the display space in generally closely spaced relation with one of their two viewing sides exposed in viewing relation and through the storage space with the viewing sides in generally closely spaced adjacent relation thus filling substantially the entire space occupied by the apparatus. Moreover, each display device is provided with opposed viewing sides which are alternately exposed during alternate movements through the display space.

Another object of the present invention is the provision of a display apparatus of the type described having improved means for effecting the movement of the panellike display devices into and out of the display space from and into the storage space which is simple in construction, and economical to manufacture and maintain.

The mechanism embodied in the display apparatus of the present invention for effecting the support and movement of the panellike display devices includes a conveyor mechanism which would have utility in conveying articles other than panellike display devices. The simple, efficient, economical and substantially maintenance free conveying mechanism of the present invention could be utilized in various industrial assembly installations and the like, such as painting relatively flat articles wherein the display space would be utilized for painting and the storage space for drying.

Accordingly, it is a further object of the present invention to provide a conveying mechanism of the type described including a track section supporting a plurality of carriers for movement therealong, and three separate drive or moving mechanisms synchronized for simultaneous movement about a single axis of rotation for effecting high-speed movement of said carriers along a first portion of the track, low-speed movement of the carriers along a section portion of the track, and high-to-low variable-speed movement along and intermediate portion of the track.

These and other objects of the present invention will become more apparent during the course of the following detailed description and appended claims.

The invention may best be understood with reference to the accompanying drawings wherein an illustrative embodiment is shown.

In the drawings:

FIG. 1 is a perspective view of an apparatus embodying the principles of the present invention;

FIG. 2 is an isometric view of the driving end of the apparatus, with parts broken away for purposes of clearer illustration;

FIG. 3 is an enlarged fragmentary sectional view taken along the line 3—3 of FIG. 2;

FIG. 4 is a diagrammatic top plan view of the apparatus showing the position of the display devices within the apparatus;

FIG. 6 is an enlarged fragmentary sectional view taken along the line 6—6 of FIG. 2;

FIG. 7 is an enlarged fragmentary sectional view taken along the line 7—7 of FIG. 6; and FIG. 8 is an enlarged fragmentary sectional view taken along the line 8—8 of FIG. 1.

GENERAL CONSTRUCTION AND MODE OF OPERATION

Figure 5:
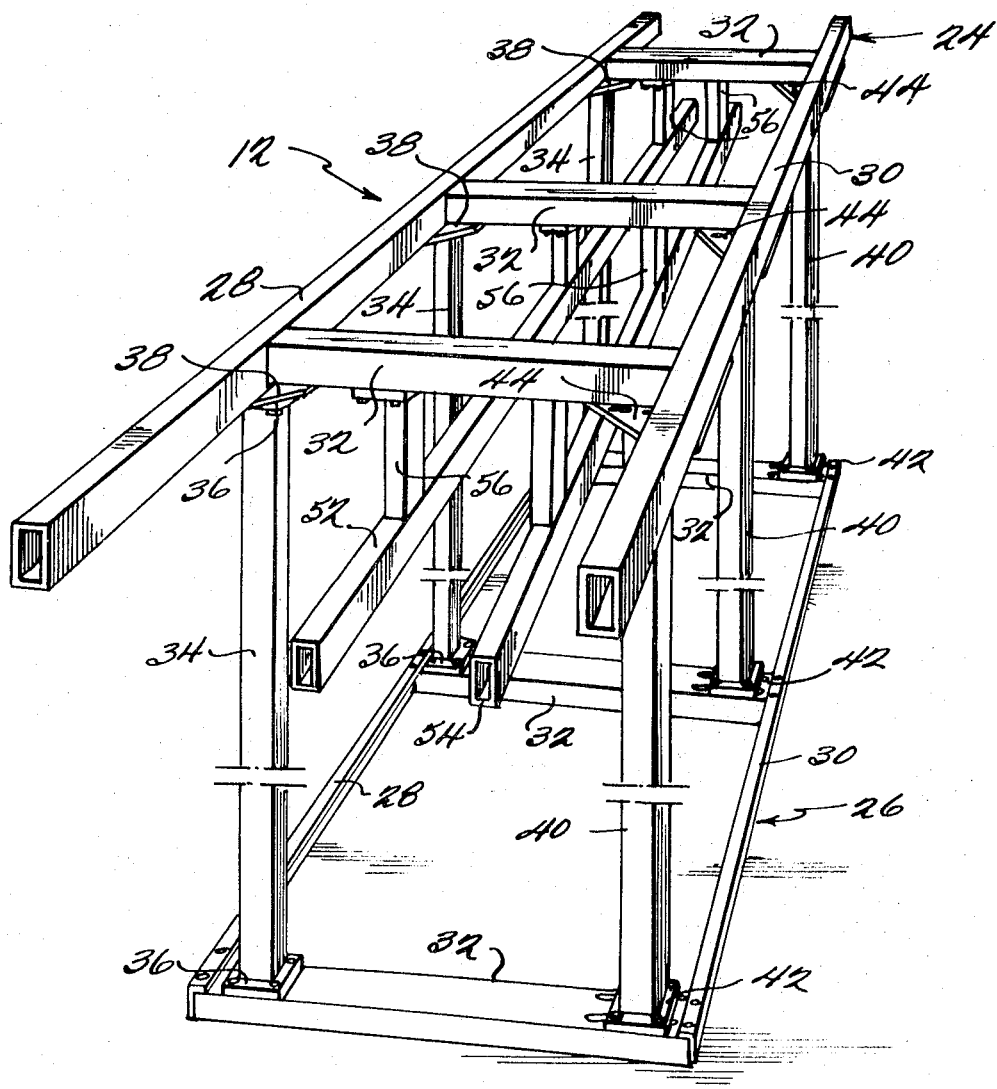
FIG. 5 is a perspective view of the frame assembly with certain parts shown in phantom for purposes of clearer illustration.

Referring now more particularly to the drawings, there is shown in FIGS. 1 and 4, a display apparatus, generally indicated at 10, embodying the principles of the present invention. In general, the display apparatus 10 includes a frame assembly, generally indicated at 12, and a multiplicity of panellike display devices, generally indicated at 14. Moveably supporting the display devices 14 on the frame assembly 12 is a conveying mechanism, generally indicated at 16, including a track and carriage assembly 18 supporting the display devices on the frame assembly 12 for movement through an endless path including a display run and a storage run and a synchronized variable speed motion transmitting assembly 20 for effecting movement of the display devices through the display run at a relatively fast speed, for effecting movement of the display devices through the storage run at a relatively slow speed, and for effecting movement of the display devices between the display run and the storage run at speeds which vary from fast to slow and vice versa. Finally, the apparatus 10 includes a cam assembly, generally indicated at 22, for guiding the movement of the display devices 14 by the conveying mechanism 16 so that during their movement along the display run, they are disposed in generally closely spaced relation with the opposed viewing sides thereof extending generally in the direction of movement and one of the viewing sides exposed in viewing relation, and during their movement along the storage run are disposed in generally closely spaced relation with each viewing side thereof extending generally transverse to the direction of movement and in opposed relation to an opposite viewing side of an adjacent display device.

Preferably, the cam assembly 22 is such as to expose in viewing relation during the movement of the display device along the display run, opposite viewing sides thereof in successive movements through the display run in the same direction.

Preferably, the ratio of the speed of movement of the display devices through the display run to the speed of movement of the display devices through the storage run is substantially equal to the ratio of the width of the display devices to the thickness of the display devices so that the display devices will be disposed in closely spaced relation during their movement through both runs thus utilizing a maximum display capability in a minimum of space.

For some applications, as, for example, when displaying articles for sale, such as wallpaper, floor and ceiling tiles and the like, it is desirable that the display devices be capable of reverse movement so that such function is preferably provided in the apparatus 10.

FRAME ASSEMBLY

The frame assembly 12 of the display apparatus 10 of the present invention may be of any suitable construction. As best shown in FIG. 5, the frame assembly 12 preferably includes a pair of upper and lower generally horizontally extending frame subassemblies 24 and 26. Each frame subassembly preferably includes a pair of parallel elongated back and front frame members 28 and 30 rigidly interconnected in parallel relation by three transversely extending cross frame members 32. As shown, all of the frame members of the upper frame subassembly 24 are of hollow tubular construction fixedly secured together, as by welding or the like. The lower frame subassembly is made up of angle iron front and back frame members and inverted channel cross frame members. Suitable adjustable leveling devices are provided below each end of each channel member for engaging the floor and supporting the entire frame assembly in level fashion.

Extending between the rear ends of each corresponding pair of cross members 32 is a rear column member 34, the ends of each column member being provided with flange plates 36 fixed thereto, as by welding or the like. Each upper flange plate is, in turn, detachably fixedly secured by any suitable means, such as bolt assemblies or the like, to a gusset plate 38 welded to the adjacent cross member 32. The associated lower flange plates rest upon and are detachably secured to the adjacent rear ends of the lower inverted channel cross members.

Disposed in parallel relation to each rear column member is a corresponding front column member 40 extending between the front ends of each pair of associated cross frame members 32. As before, the front column members 40 are provided with flange plates 42 at each end thereof, the upper flange plates being adjustably detachably fixedly secured to gusset plates 44 welded to the associated upper cross frame members and the lower flange plates being adjustably detachably fixedly secured to the adjacent front ends of the lower inverted channel cross members. Preferably, this detachable securement provides for adjustment of the front column members in a direction from front to back.

Mounted over the bottom frame subassembly 26 is a lower bolster subassembly 46 of any suitable construction provided primarily for purposes of appearance. As best shown in FIG. 1, the lower bolster subassembly 46 provides a horizontally extending floor surface 48 and a peripheral surface 50 extending vertically downwardly from the periphery of the floor surface 48.

As best shown in FIGS. 3 and 5, a pair of parallel longitudinally extending conveying mechanism back and front support members 52 and 54 is provided in vertically spaced relation below the upper frame subassembly 24 at positions between the front and rear column members 34 and 40. As shown, each of the support members 52 and 54 is secured in spaced relation below the upper frame subassembly 24 by means of a plurality of standards 56, each standard being secured at its lower end, by any suitable means, to the associated support member and at its upper end with an adjacent cross frame member 32. Preferably, the standards 56 associated with support member 52 are adjustably secured to the upper cross members 32 so as to permit adjustment of the support member 52 in a manner similar to the front columns 40.

Secured to the outer surfaces of the front and rear frame members 28 and 30 is a peripheral wall member 58 providing a vertically extending surface primarily for ornamental purposes which is in general alignment with the vertical surface 50 of the lower bolster assembly 46. Secured to the undersurface of the front support member 54 is a central rectangularly shaped ceiling member 60 (FIG. 8) having its front ends disposed in spaced relation to lower edge of the front portion of the peripheral wall 58. At each end of the central ceiling member 60 an arcuate ceiling member 62 is removably secured, by any suitable means, to the underside of the associated end of the front support member 54. The arcuate ceiling members 62 abuttingly engage the adjacent edge of the central ceiling member 60 and the periphery of the three abutting ceiling members define an endless surface having straight sides and arcuate ends, the space extending horizontally outwardly from this endless periphery surface, indicated at $s$, being open to permit movement therethrough of a portion of the conveying mechanism 16 which supports the display devices 14.

Secured beneath the back support member 52 is a complementary ceiling member 64. If desired, rear cover panels 66 may be provided between the rear portion of the upper peripheral wall 58 and the associated rear portion of the lower bolster assembly. Also, as shown in FIG. 3, a top cover plate 68 may be provided within the upper periphery of the wall 58 to protect the conveying mechanism 16 therebelow.

The ceiling members not only serve to enclose the bottom of the conveying mechanism 16, to thereby protect the same and improve the appearance of the apparatus, but serve the operational function of limiting excessive swinging or swaying of the display devices in a vertical plane during their movement into, through and out of the storage run, particularly when the display devices are being turned by the cam assembly 22.

DISPLAY DEVICES

The display devices 14 of the display apparatus 10 of the present invention are preferably of similar construction so that a description of one will suffice to give an understanding of all. A display device is susceptible of various construction, however, as shown, each is preferably in the form of a rectangular peripheral frame 70 of substantial thickness, as, for example, 3 inches. The particular construction of the frame will depend to a considerable extent upon the types of material which are to be displayed by the device. For example, a 3 inch thick peripheral frame provides sufficient display space for generally flat 3-dimensional articles such as specimens of products to be sold or the like which can fit within the space provided. With this arrangement, a central display panel 72 is suitably mounted with in the peripheral frame 70 as by conventional molding or the like such as would be provided in conventional windows. The display panel 72 which presents opposed viewing sides, provides means on which material to be displayed may be supported. Where it is desired to display articles which approximate the 3-dimensional thickness of the display space of the device, the panel may be cut out so as to centrally support the article, in which case the article would be exposed in viewing relation at each viewing side of the panel.

Where the material to be displayed will consist entirely of cardboard advertising panels, the peripheral frame may be of a thickness substantially less than 3 inches and simply provide interior peripheral grooves in the top and bottom ends of the frame and one of the sides of the frame and a vertical slot in the opposite side of the peripheral frame so as to accommodate two cardboard-type posters which may be pushed in back-to-back relation through the slot into engagement with the peripheral grooves. Of course, peripheral frame having a thickness greater than 3 inches may be provided where it is desired to display 3-dimensional articles of a size greater than 3 inches.

CONVEYING MECHANISM

The track and carriage assembly 18 of the conveying mechanism 16 of the present invention includes a track 74 in the form of an endless loop corresponding in shape to the ceiling space s previously described in connection with the frame assembly 12. The track may be of any suitable construction and, as shown, is formed of rounded tubular stock. The track is supported in a horizontal plane at a position slightly above the ceiling members, at its front portion, corresponding to the display run, as by a plurality of spaced hangers 76 or the like fixed to the front frame member 30 therealong, and at its rear portion, corresponding to the storage run, as by spaced plates 78 secured to the rear support member 52. The track is thus positioned essentially in vertically spaced relation above the space a previously described with the hangers 76 and plates 78 extending toward the outer periphery thereof.

Mounted on the track 74 is a multiplicity of carrier assemblies 80 of a number corresponding to the number of display devices provided. As best shown in FIG. 6, each carrier assembly is preferably in the form of a U-shaped carrier member having a vertically extending-bight portion 82 disposed in spaced relation to the interior periphery of the track 74, an upper horizontally extending track supporting leg 84 disposed above the track and a lower horizontally extending display device supporting leg 86 disposed below the track. Journaled beneath the upper leg 84 is a pair of track engaging rollers 88 having their axes disposed approximately at 90° with respect to each other in symmetrical relation with respect to a vertical plane passing through the axis of the track. Rigidly secured to each upper leg 84 and extending upwardly therefrom is a drive pin 90 having a drive roller 92 journaled on the upper end thereof.

Any suitable means may be provided for pivotally supporting each display device 14 to the lower leg 86 of an associated carrier assembly 80 for pivotal movement about a central vertical axis with respect to the display device. In the embodiment shown, the means for suspending each display device also provides for the longitudinal sliding movement of the display assembly out of supporting relation to the carrier assembly to permit more convenient loading and changing of the display devices.

As best shown in FIG. 6, each lower support leg 86 is apertured to rotatably receive, as by a bearing assembly or the like, the upper end of a vertically extending shaft or pin 94, the lower end of which is fixedly secured to the central portion of an elongated display device receiving member 96. The display device receiving member 96 is preferably of conventional configuration in cross section providing a generally T-shaped slot extending longitudinally of the member. A T-shaped member 98 is fixedly secured to the upper end portion of the peripheral frame 70 of the associated display device 14, the horizontal flange thereof being adapted to engage within the T-shaped slot of the display device receiving member 96. With this construction, the entire display device can be removed from the associated carrier assembly by a sliding movement when the display device is disposed in the storage run. If desired, a spring detent 100 may be provided in the member 98 for engaging a recess 102 in the member 96 when the former has been moved completely into the latter so as to effectively insure attachment of the display device with the carrier assembly during operation of the apparatus.

While the above arrangement is preferred, it will be understood that the carrier assembly may be readily adapted to detachably receive the display devices in such a way that the display devices can be separated from the carrier assemblies while in the display run, rather than the storage run or in addition to the storage run.

As best shown in FIG. 4, the synchronous variable speed motion transmitting assembly 20 of the conveyor mechanism 16 includes a relatively large high-speed display endless chain 104, a relatively small, slow-speed storage endless chain 106, a driven synchronous sprocket assembly 108 and an idler synchronous sprocket assembly 110, the sprocket assemblies being disposed at each end of the frame assembly 12 adjacent the upper frame subassembly 24 and having the display and storage chains 104 and 106 trained thereabout. The synchronous sprocket assemblies 108 and 110 are of similar construction except that the driven synchronous sprocket assembly 108 is driven directly by a source of rotative power, whereas the idler synchronous sprocket assembly 110 is driven by the chains 104 and 106 in response to the rotation of the driven synchronous sprocket assembly and consequently a description of one will suffice to give an understanding of both.

As best shown in FIGS. 2 and 3, the driven synchronous sprocket assembly 108 comprises a horizontally extending generally rectangular mounting plate 112 secured beneath the adjacent ends of the elongated members 28 and 30 of the upper frame subassembly 24. Preferably, the mounting plate 112 is mounted for adjustment longitudinally with respect to the upper frame subassembly, as by an adjusting mechanism 114 (FIG. 3) which serves as a chain tightener. Fixedly mounted on the upper surface of the central portion of the mounting plate 112 is a heavy duty bearing assembly 116 within which is journaled a main drive shaft 118 for rotation about a vertical axis.

As best shown in FIG. 3, in the case of the driven synchronous sprocket assembly 108, the main drive shaft 118 extends upwardly of the bearing assembly 116 and has a drive pulley 120 fixedly secured thereto. The drive pulley 120 is driven by a reversible electric gear motor 122 carried by a bracket 124 fixedly mounted on the upper frame subassembly. The drive from the output shaft of the motor 122 to the drive pulley 120 may be through a pair of belts 126 and 128 providing appropriate speed reduction. As shown, an idler shaft 130 is journaled for rotation about a vertical axis, as by a bearing assembly 132 mounted on the bracket 124. The motor is mounted on the bracket 124 for adjustment toward and away from the baring assembly 132 so as to provide for the tightening of the belt 126 which is trained about a pulley 134 on the output shaft of the motor 122 and a pulley 126 on the idler shaft 130. The bearing assembly 132 is mounted for longitudinal adjustment on the bracket 124 to provide for the tightening of the belt 128, which is trained about the drive pulley 120 and a second pulley 138 on the idler shaft 130.

Fixedly secured to the main shaft 118 at a position spaced above the upper surface of the ceiling members 62 and 64 is a storage sprocket wheel 140 about which the adjacent end of the storage chain 106 is trained. Fixed to the shaft 118 immediately above the storage sprocket wheel 140 is a relatively large display sprocket wheel 142 about which the adjacent end of the display chain 104 is trained.

As previously described, since the ratio of the speed of movement of the display devices 14 through the display run to the speed of movement of the display devices through the storage run is preferably generally equal to the ratio between the width of the display devices to the thickness of the display devices, the relative size s of the display sprocket wheel and the storage sprocket wheel will likewise have a similar ratio. For example, with display devices having a width of 24 inches and a thickness of 3 inches, the display sprocket wheel will be of conventional construction having 192 teeth, while the storage sprocket is of conventional construction having 24 teeth.

As best shown in FIGS. 2, 3, and 6, the display chain 104 is provided with a multiplicity of carrier assembly driving elements 144 each of which, as shown, is of generally U-shaped construction having its horizontally extending upper leg fixed to the underside of the chain and its horizontally extending lower leg provided with a drive pin receiving slot 146 opening inwardly with respect to the chain.

In a like manner, the storage chain 106 is provided with a multiplicity of spaced carrier assembly driving elements 148 which as shown, are in the form of plates secured to the underside of the storage chain and extending outwardly thereof and having a pin receiving slot 150 therein which opens outwardly with respect to the storage chain.

The spacing of the carrier assembly driving elements 144 and 148 on the chains is directly related to the size of the associated sprocket wheel. Thus, carrying forward the exemplary embodiment noted above, a driving element 144 would be secured to the display chain at intervals of 48 links of the chain whereas the driving elements 148 of the storage chain would be secured to the storage chain at intervals of 6 links.

As best shown in FIG. 2, it will be noted that the track 74 is positioned with respect to the display and storage chains such that the front flight of the display chain is spaced substantially directly above the front portion of the track and the rear flight of the storage chain is spaced substantially directly above the rear portion of the track. Consequently, the driving elements 144 of the display chain 104 will engage and move the carrier assemblies 80 on the front portion of the track 74 constituting the display run of the display devices, and the driving elements 148 of the storage chain 106 will engage and move the carrier assemblies 80 along the rear portion of the track 74, constituting the storage run.

The carrier assemblies 80 are moved along each intermediate end portion of the track 74 by a plurality of cam actuated transfer drive assemblies 152 carried by the associated display sprocket wheel for rotation therewith. In order to insure that each successive carrier assembly 80 will be positively moved along the associated curved intermediate end of the track, four transfer assemblies 152 are provided in equal circumferentially spaced relation about the display sprocket wheel.

As best shown in FIGS. 2, 6 and 7, each transfer assembly 152 comprises a pair of parallel elongated rectangular drive members or plates 154 defining a radial passage therebetween disposed within a corresponding pair of slots 156 formed in the display sprocket wheel in parallel relation to a radial median plane therebetween. Each pair of plates 154 extends generally vertically and are spaced apart a distance sufficient to receive therebetween the upper drive roller 92 on the drive pin 90 of the carrier assemblies. The upper marginal edges of each pair of plates extend above the upper surface of the display sprocket wheel 142 and are rigidly interconnected as by a pair of spaced blocks 158.

Each pair of rigidly interconnected plates 154 is mounted for movement within the associated slots 156 between a raised inoperative position, wherein the lower end portions of the plates are disposed above the path of movement of the carrier assembly drive rollers 92, and a lowered operative position, wherein the lower end portions of the plates are disposed within the path of movement of the drive rollers 92. Preferably, each pair of plates 154 is guided between their raised and lowered positions so that the plates are capable of a tilting action. This tilting action insures proper movement and prevents any possible binding during operation. Any suitable means may be provided for achieving this function and, as shown, preferably a pair of radially spaced inner and outer guide posts 160 are rigidly secured to the display sprocket wheel 142 at their lower ends in a position between the associated slots 156 and extend upwardly through a pair of trunnion blocks 162. Each trunnion block includes a suitable bearing slidably receiving the associated post 160 and has a pair of trunnion pins extending outwardly from opposite sides thereof engageable within horizontally elongated slots 164 formed in the associated pair of plates.

Fixedly secured to the upper surface of each block 158 is a mounting plate 166. The adjacent end portions of the mounting plates 166 are formed with L-shaped portions 168 adapted to receive the upper ends of a pair of coil springs 170, the lower ends of which are disposed in engagement with the upper surface of the display sprocket wheel 142 disposed therebelow. The springs 170 serve to resiliently urge the associated pair of plates 154 upwardly into the inoperative position thereof. In order to limit the upward movement of the plates under the action of the springs 170, the posts 160 are provided with enlarged upper ends, although it will be understood other stop arrangements may be utilized.

Each pair of plates 154 is arranged to be disposed in its inoperative position the portion of its movement with the display sprocket wheel 142 which is not coextensive with the associated intermediate end portion of the track 74. Each pair of plates 154 is moved into its operative position during the portion of its movement which is coextensive to the associated intermediate and portion of the track by cam means, which, as shown, is in the form of a fixed arcuate cam track 172 and a pair of cam rollers 174 associated with each pair of plates 154. As best shown in FIG. 2, the arcuate cam track 172 has an angular extent of approximately 180° and includes an upwardly inclined surface 176 at each end thereof. The cam track is mounted in spaced relation below the mounting plates 112 by any suitable means, such as a plurality of spacers 178 or the like. The cam rollers 174 are preferably mounted on upwardly extending projections 180 formed on the outer ends of the plates 166.

CAM ASSEMBLY

The cam assembly 22 of the apparatus 10 is operable to effect a pivotal movement of 90° of each successive display device about the axis of its pin 94 during its movement along each curved end portion of the track 74 by the associated transfer assembly 152. In order to effect this pivotal movement, a pair of cam members 182 and 184 is provided on the underside of the ceiling member 64 adjacent each end of the apparatus.

The cam members 182 and 188 mounted at each end of each display device receiving member 96 for rotation about axes parallel with the associated pin 94 and equally spaced therefrom. It will be understood that depending upon the direction of movement of the display devices, one of the cam rollers will constitute a leading cam roller and the other a trailing cam roller during the movement of the associated display device through the display run. For convenience in description, the cam roller 186 will be considered the leading cam roller, and the cam roller 188 will be considered the trailing cam roller.

Since the pair of cam members 182 and 184 at each end of the apparatus are substantial mirror images of each other, a description of one pair will suffice to give an understanding of both. As best shown in FIG. 8, the cam member 182 includes a main arcuate inwardly facing cam surface 190 which is adapted to be engaged by the leading cam roller 186 as the associated display device is moved out of the display run. The main arcuate cam surface 190 during the engagement of the leading cam roller therewith serves to effect a controlled pivotal movement of substantially 90°. Provided as a continuation of the cam surface 190 is a generally sinuously curved cam surface 192 which serves to complete the 90° pivotal movement of the leading cam roller 186 therewith and to guide the display device after it has been turned into the storage run. At the opposite end of the main arcuate cam surface 190 is an outwardly arcuate cam surface 194 which is adapted to be engaged by the trailing cam roller 188 during the last part of the turning movement of the associated display device. The cam member 184 includes an outwardly facing cam surface 196 which is generally parallel to the cam surface 192 and an adjacent end of the main arcuate cam surface 190.

In order to stabilize the movement of the display devices through the display run and to insure that the leading cam roller 186 will properly engage the first portion of the main arcuate cam surface 190, a longitudinally extending cam track 198 is mounted adjacent the lower longitudinal edge of the upper vertical wall of the frame assembly, as by securement with the hangers 76. The cam track 198 is conveniently formed of L-shaped stock and positioned so that the horizontal flange is closely adjacent the top of the cam rollers (see FIG. 3).

DETAILED OPERATION

As was previously indicated in the description of the general construction and made of operation of the present apparatus, it is preferable that the display devices 14 are constructed so that the ratio of their width to their thickness is equal to the ratio of the speed of movement of the display devices through the display run to the speed of movement through the storage run. This relationship is obtained by selecting display and storage sprocket wheels having their diameters and their peripheral teeth in this same ratio. When these relationships are maintained, the display devices disposed within the storage run will be disposed, as clearly shown in FIG. 4, in closely spaced relation with each viewing side thereof extending generally transverse to the direction of movement and in opposed relation to an opposite viewing side of an adjacent display device. Moreover, the display devices in the display run will likewise be disposed in closely spaced relation with a viewing side thereof extending generally in the direction of movement and in exposed viewing relation.

These relationships are highly significant since the close spacing maintained between adjacent display devices whether they are disposed in the storage run or the display run insure that a maximum display capability within the space occupied by the apparatus is obtained. Where the thickness of the display space provided by the display devices is substantially less than 1½ inches, it may become physically impossible to strictly adhere to these relationships due to the fact that physical requirements limit the minimum size of the storage sprocket wheels.

With the above in mind, the motor 122 is energized to effect operation of the apparatus which sets all of the display devices in motion in one direction as, for example, in a direction in which the display devices move from right to left as viewing in FIG. 1. The display devices at the front of the apparatus will be moved from the right-hand end of the display run to the left-hand end thereof by the relatively fast moving display chain 104 through the engagement of the drive pins 90 of the carrier assemblies 80 within the slots 146 of the drive elements 144 on the chain. Moreover, the movement of each display device along the display run is stabilized by virtue of the engagement of the outer peripheries of the cam rollers 186 and 188 with the cam track 198. As each display device 14 reaches the left-hand end of the display run, the leading cam roller 186 will engage the first portion of the cam surface 190 prior to the time that the associated drive pin 90 reaches the drive display sprocket wheel 142.

It will be noted that the drive plates 154 of the associated transfer assembly 152 will be disposed in their lowered operative position when the drive element 144 of the display chain 104 associated with the display device moves adjacent the periphery of the display sprocket wheel. Approximately 1 inch beyond this point, the curvature of the adjacent curved intermediate portion of the guide track 74 departs from the curvature of the portion of the display chain 104 engaging the display sprocket wheel 142. Thus, as each display device 14 is moved beyond this point, the associated carrier assembly 80 guided by the track 74 will have a radially inward movement with respect to the curved end of the display chain 104. In this way, the pin 90 of the associated carrier assembly 80 is moved radially inwardly out of the associated slot 146 of the drive element 144 of the display chain 104 and the associated drive roller 92 is moved radially inwardly between the lowered pair of plates 154 of the associated transfer assembly 152. During subsequent movement, the trailing plate 154 of the associated transfer assembly 152 serves to impart movement to the display device 14 through the associated carrier assembly 80. During this movement by the trailing plate of the transfer assembly 152, the carrier assembly 80 will be moved around the curved end portion of the track 74 at a speed which varies beginning at the relatively fast speed of the display chain 104 and ending at the relatively slow speed of the storage chain 106. This variation is accomplished by the changing radius from the axis of rotation of the display sprocket wheel 142 which exists at the point of contact between the trailing plate 154 of the associated transfer assembly 152 and the drive roller 92 of the associated carrier assembly 80.

It will be noted that as the associated transfer assembly 152 approaches the position where the display chain 104 leaves the display sprocket wheel 142, the trailing inclined cam surface 176 will be engaged by the associated cam rollers 174 thus commencing the movement of the plates 144 from their lowered position to their raised position so that they will be out of the path of movement of the drive rollers 92 during the next approximately 180° travel of the transfer assembly with the display sprocket wheel. It is significant to note that the movement of the cam rollers 174 up the trailing inclined cam surface 176 takes place substantially simultaneously with the downward movement of the diametrically opposed transfer assembly on the leading inclined cam surface 176. In this way, the resilient action of the springs 170 of the transfer assemblies 152 counterbalance one another so as to minimize the introduction of vibratory effects in the rotation of the sprocket wheels.

As the transfer assembly reaches a point adjacent the left-hand end of the storage run of the track, the pin 90 of the carriage assembly 80 will have moved into engagement with the slot 150 of the drive element 148 of the storage chain 106 and the drive roller 92 of the carriage assembly 80 will have moved radially inwardly out of engagement with the trailing plate 154 of the associated transfer assembly 152. In this way, the transfer assemblies 152 serve to effect movement of each successive display device 14 about the curved intermediate portion of the track 74, initially taking over the driving effect from the display chain 104 and finally transferring the driving effect to the storage chain 106.

Moreover, during this movement around the curved end portion of the track 74, the cam members cooperate with the cam rollers on the respective display device to effect a pivotal movement of the display device, in a clockwise direction as viewed in FIG. 1, about the central axis of shaft 94.

When the pin 90 of the carriage assembly associated with the display device begins its movement around the curved portion of the trace 74, the leading cam roller 186 has its outer periphery in engagement with the cam surface 190 of the associated cam member 182 and the trailing cam roller 188 still has its outer periphery in engagement with the display cam track 198. As the associated carrier assembly 80 is moved around the track 74, the leading and trailing cam rollers 186 and 188 remain in contact with the respective cam surfaces mentioned above, during which the turning movement is initiated, as is clearly shown in FIG. 8. This action continues as the trailing cam roller 188 moves off of the end of the display cam track 198 and onto the cam surface 194. As the trailing cam roller 188 moves off of the cam surface 194, cam surface 196 contacts the inner periphery of the leading cam roller 186 to thereby maintain positive control of the turning movement of the display device. The turning of the display device to an extent of 90° is completed during the initial contact of the leading cam roller 186 with the cam surface 196 and during subsequent movement of the display device, the cam surfaces 192 and 196 merely serve to guide the display device, through engagement with opposite sides of the periphery of the leading cam roller 186, with a substantially pure translational movement into the storage run.

It will be noted that each display device is then moved at a relatively slow speed under the driving action of the storage chain 106 through the storage run with the viewing sides disposed perpendicular to the direction of travel. When each display device reaches the right-hand end of the storage run, the associated transfer assembly 152 will take over the driving action and finally transfer it to the right-hand end of the operative flight of the display chain. During this movement this display device is again pivoted 90° about its central axis, in a clockwise direction as viewed in FIG. 1. Consequently, when the display device is again moved through the display run, it will have been pivoted about its central axis a total of 180° so that during this movement the opposite viewing side of the display device will be exposed in viewing relation.

The preferred embodiment of the display apparatus 10 of the present invention, as described above, is capable of effecting movement of the display devices 14 in either direction through the display and storage runs by virtue of the reversible motor 122, the symmetrical arrangement of the conveying mechanism 16 and cam assembly 22 and the opposed driving surfaces provided by the drive elements 144 and 148 and drive plates 154.

Insofar as the conveying mechanism 16 itself is concerned, it is important to note that it includes a plurality of separate driving means, two off which transmit motion at different constant speeds and transfer means between the two capable of transmitting motion at variable speeds. Yet, the separate driving means at each end of the apparatus are all fixed to a single rotating shaft. This relationship positively insures that the separate drives cannot get out of synchronism and can be powered by a single driving motor. Thus, by keying both the display and the storage sprockets to a single shaft, the sprockets will necessarily have a common rotational velocity. In conjection with this relationship, the associated transfer means is likewise effectively keyed to the same shaft and has a driving action which effects either an accelerating or decelerating movement along a radial line common to the united sprockets without discontinuities and in perfect synchronism with either chain.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. A conveying mechanism comprising first and second sprocket wheels of different diameter sizes mounted for rotational movement about a common axis at a common angular speed of rotation, first and second endless chains trained about said first and second sprocket wheels, respectively, for movement at different speeds having a ratio equal to the ratio of the different diameter sizes of the respective sprocket wheels, said first chain including an operative flight leading to said first sprocket wheel, said second chain including an operative flight leading from said second sprocket wheel, a track section including first and second portions disposed in cooperating relation to the operative flights of said first and second chains, respectively, and an intermediate portion between said first and second portions, a carrier assembly mounted on said track section for movement therealong, first drive means on said first chain for operatively engaging said carrier assembly and moving the same along said second track portion at a speed corresponding to the speed of said second chain, and transfer drive means movable about the common axis of rotation of said sprocket wheels and at the common angular speed of rotation thereof for operatively engaging said carrier assembly and moving the same along said intermediate track portion so that said carrier assembly can be continually engaged and moved along said track section successively by said first drive means, said transfer-drive means and said second drive means during the rotation of said sprocket wheels.

2. A conveying mechanism as defined in claim 1 wherein said transfer-drive means includes a radially extending drive member, means includes a radially extending drive means mounting said drive member for rotational movement with said first sprocket wheel and for movement between an operative position wherein said drive member is disposed to operatively engage a carrier assembly and an inoperative position wherein said drive member is disposed to prevent operative engagement with said carrier assembly, and cam means for effecting movement of said drive member into said operative position during an operative portion of its rotational movement with said first sprocket wheel and for effecting movement of said member into said inoperative position during another portion of the rotational movement of said first sprocket wheel.

3. A conveying mechanism as defined in claim 2 wherein said first and second drive means includes driving elements fixed to said first and second chains, respectively, said driving elements on said first and second chains having carrier assembly receiving slots formed therein opening inwardly and outwardly, respectively, and wherein said transfer-drive means includes a second radially extending drive member fixed with respect to said first-mentioned radially extending drive member in parallel relation therewith whereby said drive means are operable to effect movement along said track section in either direction.

4. A conveying mechanism as defined in claim 2 wherein said drive member is provided with spring means resiliently urging said drive member into said inoperative position and wherein said cam means comprises cam roller means carried by said drive member and a fixed cam surface disposed in a position to engage said cam roller means and to move said drive member into said operative position against the action of said spring means during the operative portion of the rotational movement thereof.

5. A conveying mechanism as defined in claim 4 wherein said drive-member mounting means comprises a pair of radially spaced shafts fixedly carried by said first sprocket wheel with their axes parallel with the axis of rotation of said first sprocket wheel, a pair of members slidably mounted on said shaft and pivotally slidably connected with said drive member, said cam roller means including a pair of radially spaced cam rollers.